US012739125B2

(12) United States Patent
Allphin et al.

(10) Patent No.: US 12,739,125 B2
(45) Date of Patent: Sep. 15, 2026

(54) BLOCKCHAIN ENHANCED LAYERED AND INTEGRATED CYBER SECURITY METHOD AND SYSTEM

(71) Applicant: The United States of America as represented by the Secretary of the Navy, Arlington, VA (US)

(72) Inventors: James Allphin, San Diego, CA (US); Anthony Quintero-Quiroga, San Diego, CA (US); David Kwon, San Diego, CA (US); Barry Dudley, Philadelphia, PA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 35 days.

(21) Appl. No.: 19/061,021

(22) Filed: Feb. 24, 2025

(65) Prior Publication Data

US 2026/0254652 A1 Aug. 27, 2026

(51) Int. Cl.

*G06F 21/62* (2013.01)
*H04L 9/00* (2022.01)
*H04L 9/32* (2006.01)

(52) U.S. Cl.

CPC ........ *H04L 9/3236* (2013.01); *G06F 21/6245* (2013.01); *H04L 9/50* (2022.05)

(58) Field of Classification Search

CPC . G06F 21/60–6245; G06F 21/64; H04L 9/50; H04L 9/3236

See application file for complete search history.

(56) References Cited

U.S. PATENT DOCUMENTS 11,720,549 B1 * 8/2023 McKervey ............ H04L 9/3239 707/690
2019/0207957 A1 * 7/2019 Espinosa .................. G06F 8/65

OTHER PUBLICATIONS

Allphin, J., Quintero-Quiroga, A., Kwon, D., & Naval Information Warfare Center. (n.d.). HELICS: From reactive to proactive: blockchain powered cyber security [Poster]. "Welcome to the Future" Engineers Week, San Diego, United States of America. Feb. 27, 2024.

Allphin, J., Quintero-Quiroga, A., Kwon, D., & Dudley, B. (2024). Hyperledger Enhanced Layered and Integrated Cyber Security (HELICS) (Technical Document 3429). Mar. 20, 2024. Naval Information Warfare Center, Pacific. Technical Document 3429; NIWC Pacific Document ID: TD-3429. https://www.dtic.mil/.

* cited by examiner

*Primary Examiner* — Trong H Nguyen

(74) *Attorney, Agent, or Firm* — Naval Information Warfare Center Pacific; Evan Hastings; Kyle Eppele

(57) ABSTRACT

A blockchain enhanced layered and integrated cyber security method and system. In one embodiment, a method of cybersecurity monitoring, the steps comprising: performing a security analysis of an information system, wherein the security analysis comprises a plurality of security criteria; (b) creating a plurality of security hash values associated with each of the plurality of security criteria; (c) generating a baseline master hash comprising an amalgamation of the plurality of security hash values; (d) submitting the baseline master hash to a blockchain ledger; (e) revalidating the information system after a revalidation epoch; and (f) repeating step (e) over successive revalidation epochs to monitor the information system for hash mismatches.

17 Claims, 8 Drawing Sheets

Fig. 5C
Fig. 5D
[*] Timer running for automatic STIG checks
[] HELICS AGENT STARTING
[*] Start chaincode event listening
[*] Completing STIG checks
[*] Master hash:
[*] Asset updated successfully
[*] Completing STIG checks
[*] Master hash:
[*] Asset updated successfully
[*] Completing STIG checks
[*] Master hash:
[*] Asset updated successfully
[*] Completing STIG checks
[*] Master hash:
[*] Asset updated successfully
[*] Completing STIG checks
[*] Master hash:
[*] Asset updated successfully
[*] Completing STIG checks
[*] Master hash:
[*] Asset updated successfully
[*] Completing STIG checks
[*] Master hash:
[*] Asset updated successfully
[*] Completing STIG checks
[*] Master hash:
[*] Asset updated successfully

```
[
  {
    "txId": "e6e7c211f180d9b030408bb35165e42b974501f63466b3abf39d0680c7117a28",
    "value": {
      "Compliant": false,
      "Hash": "da39a3ee5e6b4b0d3255bfef95601890afd80709",
      "Owner": TEST-ORG1 ,
      "System": ASSET-1 ,
      "Version": 1,
      "update_baseline_required": false
    },
    "timestamp": "2023-07-24 16:29:08"
  },
  {
    "txId": "6161e65eb37c83bd408ebec1000e560e3897ac0b5046100aba6bf05e3bfe7a0d",
    "value": {
      "Compliant": false,
      "Hash": "TEST-HASH-INVALID",
      "Owner": TEST-ORG1,
      "System":test-asset-2,
      "Version": 1,
      "update_baseline_required": false
    },
    "timestamp": "2023-07-24 16:24:13"
  },
```

Fig. 7

BLOCKCHAIN ENHANCED LAYERED AND INTEGRATED CYBER SECURITY METHOD AND SYSTEM

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: NIWC_Pacific_T2@us.navy.mil, referencing Navy Case No. 212,319.

FIELD OF USE

The present disclosure pertains generally to a blockchain-enabled cybersecurity monitoring tool.

BACKGROUND

Blockchain is a distributed ledger technology that is being widely adopted for security applications. A distributed network of nodes provide robustness and at a level unmatched by other technologies. Some examples of the blockchain uses include for secure data storage and integrity. In this disclosure, the blockchains immutable nature insures that as data is written and stored, it cannot be altered or tampered with. This is valuable for storing sensitive information and created unbreakable audit trails. For another example, the blockchain is being applied Internet of Things (IoT) security, where device identities may be authenticated to ensure the integrity of communications, firmware updates, and secure vulnerabilities. Each of these exemplary use cases have been increasingly levered for cybersecurity applications due to their transparency, immutability, and decentralization.

Collaborative blockchain efforts, such as the open-source Hyperledger Project hosted by the Linux foundation, have further advanced blockchain possibilities by providing tools, frameworks, and libraries for the public to build with and deploy. Security applications for blockchains often implement permissioned blockchains over permissionless blockchains, which by and large favors security and privacy over access and transparency. Permissioned blockchains consist of nodes each associated with customized access privileges and known identities. For example, permissioned blockchain networks could be used for supply chain management of agricultural goods. Each participant in the supply chain (farmer, distributor, grocer . . . ) may record events and data to the blockchain. The blockchain ledger would then contain information pertaining to product tracking, product origin, and safety compliance (e.g. a contamination incident). Hyperledger Fabric stands out among Hyperledger projects by offering a permissioned and modular architecture, allowing organizations to build confidential and adaptable blockchain networks tailored to their specific needs.

Many government entities, business/corporate entities, educational institutions, and non-governmental organizations have a need to safeguard and monitor information and data systems. The internet has expedited the proliferation of sensitive information from personally identifiable information (PII), health records, trade secrets, or classified information, as examples. Not only is the securing of this information expected by clients and consumers, but may even be required by law. Current techniques for cybersecurity monitoring include Microsoft Defender for Endpoint, Trellix Endpoint Security, and Security Information and Event Management (SIEM) tools, such as Splunk. Each of these tools can continuously monitor a system but do not adequately automate a system's protection from unauthorized baseline changes that may come from an insider threat, or outside adversary. Moreover, the logged data for these tools can be altered to hide any wrongdoing or contain too much information that can make it difficult to pinpoint when a breach occurred. Accordingly, there is a pressing need to transparently, efficiently, and immutably safeguard databases and information against intentional hacking or inadvertent spillage of private information.

SUMMARY

According to illustrative embodiments, a method of cybersecurity monitoring, the steps comprising (a) performing a security analysis of an information system, wherein the security analysis comprises a plurality of security criteria; (b) creating a plurality of security hash values associated with each of the plurality of security criteria; (c) generating a baseline master hash comprising an amalgamation of the plurality of security hash values; (d) submitting the baseline master hash to a blockchain ledger; (e) revalidating the information system after a revalidation epoch, further comprising: performing a subsequent security analysis, generating a subsequent master hash comprising a plurality of subsequent security hash values associated with each of the plurality of security criteria, determining whether the subsequent master hash matches the baseline master hash, wherein: upon determining that the subsequent master hash matches the baseline master hash, writing the subsequent master hash to the blockchain ledger, or upon determining that the subsequent master hash mismatches the baseline master hash, writing the subsequent master hash to the blockchain ledger, and notifying a system administrator of a mismatch; and (f) repeating step (e) over successive revalidation epochs to monitor the information system for hash mismatches.

In some embodiments, a non-transitory computer-readable storage medium with computer executable instructions stored thereon executable by a process to perform the method of cybersecurity monitoring, the steps comprising (a) performing a security analysis of an information system, wherein the security analysis comprises a plurality of security criteria; (b) creating a plurality of security hash values associated with each of the plurality of security criteria; (c) generating a baseline master hash comprising an amalgamation of the plurality of security hash values; (d) submitting the baseline master hash to a blockchain ledger; (e) revalidating the information system after a revalidation epoch, further comprising: performing a subsequent security analysis, generating a subsequent master hash comprising a plurality of subsequent security hash values associated with each of the plurality of security criteria, determining whether the subsequent master hash matches the baseline master hash, wherein: upon determining that the subsequent master hash matches the baseline master hash, writing the subsequent master hash to the blockchain ledger, or upon determining that the subsequent master hash mismatches the baseline master hash, writing the subsequent master hash to the blockchain ledger, and notifying a system administrator of a mismatch; and (f) repeating step (e) over successive revalidation epochs to monitor the information system for hash mismatches.

It is an object to provide a Blockchain Enhanced Layered and Integrated Cyber Security Method and System that offers numerous benefits, including an immutable, fast, resource efficient, and highly available cybersecurity monitoring method and system. Transactions utilizing the Blockchain Enhanced Layered and Integrated Cyber Security Method and System (also referred to as "HELICS", in some embodiments wherein the blockchain is a Hyperledger) may be recorded almost instantly and cannot be altered. Furthermore, the blockchain network is more secure than traditional applications due to its distributed nature, meaning that most of the nodes would need to be compromised for the blockchain network to fail. In comparison, a single compromised server could cause an outage with current information systems. Due to the versatility of smart contracts and the robustness of Hyperledger Fabric, the HELICS agent can be customized to use any cyber security tool and may be compiled to run on any computer architecture.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings:

FIG. 7 shows an exemplary screenshot of a historical record of asset on Hyperledger.

DETAILED DESCRIPTION OF EMBODIMENTS

Figure 1:
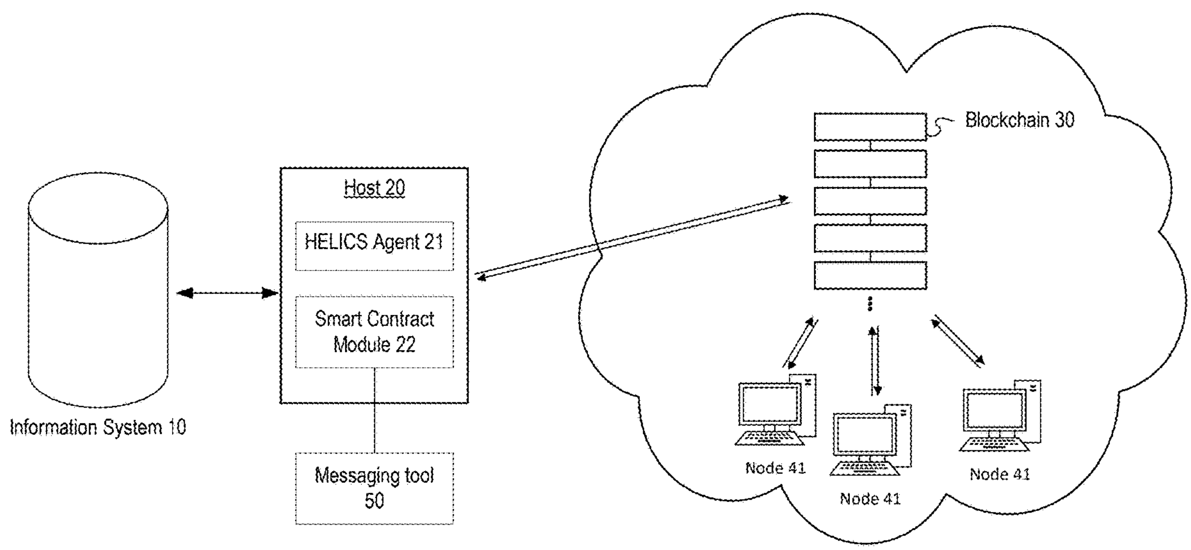
FIG. 1 shows a graphical illustration of a host comprising a HELICS agent and Smart Contract Module connected to an information system and a blockchain network.

The disclosed system and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other system and methods described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Inventors sought a fast, efficient, and robust strategy to secure and continuously monitor information systems for changes in security criteria. Today, common practices predominantly rely on manual reviews and spontaneous assessments. Even with stringent manual scanning and patch management practices, systems can still be vulnerable to zero-day attacks, supply chain shortfalls, and insider threats.

A foremost cybersecurity concern is an unauthorized access leading to the installment of a "back door". If an information system is infiltrated, damage is typically limited to the contents of that device or network. However, if an intruder is able to manipulate security permissions, system settings, or others gain access beyond that of a single information system, the threat becomes much more pervasive. Accordingly, programs, operating systems, networks, and applications contain built-in security criteria that can be used to assess their available security settings. Those security settings are closely managed by organizations to limit cyber threats. For some organizations, these security criteria a formalized in standards for uniformity and compliance. One example of formalized standards are STIGs (Security Technical Implementation Guide), which are a set of guidelines developed by the Defense Information Systems Agency (DISA) to help prevent unauthorized access, use, disclosure, disruption, modification, or destruction of sensitive information.

The Blockchain Enhanced Layered and Integrated Cyber Security Method and System is an advantaged solution for continuously monitoring a system's secure baseline according to security criteria. Once a system's secure baseline is captured via periodical security analysis using an installed agent and uniquely identified via a hash value, the hash value may then be submitted to a blockchain ledger (in one embodiment, a Hyperledger) for continuous monitoring. This method offers several significant and advantages. Not only would the hash value of the secure baseline create a more accurate representation of the system for continuous monitoring, but using Hyperledger Fabric to monitor the system's hash for changes would add greater integrity to the continuous monitoring process as well as allow for automation in the vulnerability management process.

FIG. 1 shows a graphical illustration of a host 20 comprising a HELICS agent 21 and Smart Contract Module 22 connected to an information system 10 and a blockchain network 30. The host 20 may be designed to implement a method of cybersecurity monitoring 200 or a non-transitory computer-readable storage medium with computer executable instructions stored thereon executed by a process to perform the method of cybersecurity monitoring 300. The a method of cybersecurity monitoring 200 or a non-transitory computer-readable storage medium with computer executable instructions stored thereon executed by a process to perform the method of cybersecurity monitoring 300 may be used in any environment where tracking the changes of an information system is desired.

In some embodiments, the Hyperledger Fabric may be used for the blockchain framework. The advantages of Hyperledger Fabric include that it is immutable, fast, resource efficient and highly available. Transactions on the Hyperledger are recorded almost instantly and cannot be altered. The Hyperledger network is more secure than traditional applications due to its distributed nature. Most of the nodes would need to be compromised for the Hyperledger network to fail. In comparison, a single compromised server could cause an outage with current information systems. Hyperledger Fabric is also open-sourced and backed by IBM, Intel, and the Linux Foundation. The unique advantages of blockchains and the Hyperledger Fabric provide a new ways of maintaining a historical record of an information systems baseline configuration.

The information system 10 may comprise sensitive, confidential, or otherwise private information desired to be requested by an administrator. Information systems that store data encompass a broad range of architectures and technologies, each designed to meet specific needs and applications. These include, but are not limited to, relational database management systems (RDBMS) such as MySQL and Oracle, which organize data into structured tables with well-defined relationships. In contrast, NoSQL databases like MongoDB and Cassandra offer flexible schema designs, capable of handling large amounts of unstructured or semi-structured data. Additionally, cloud-based storage solutions like Amazon S3 and Google Cloud Storage provide scalable and redundant data repositories, often leveraging object storage paradigms. File systems, including network file systems (NFS) and distributed file systems like Hadoop Distributed File System (HDFS), manage data as a hierarchy of files and directories, while data warehouses like Amazon Redshift and Google BigQuery are optimized for analytical workloads, storing data in a structured format to facilitate complex queries and business intelligence applications. Furthermore, content management systems (CMS) such as Drupal and SharePoint, and enterprise resource planning (ERP) systems like SAP and Oracle ERP, integrate data storage with specific business functionalities, managing a wide range of data types, from documents and multimedia to financial transactions and operational metrics. Each of these information systems 10 employs distinct data models, storage mechanisms, and access protocols, catering to the diverse requirements of modern data-driven applications and organizations.

In one embodiment, the information system 10 is an immutable system. Immutable systems may include immutable operating systems, immutable infrastructure, or immutable deployment, which are operating system designed to be unchangeable and read-only. Once an immutable operating system has been installed, the system files and directories cannot be modified. Any changes made to the system are temporary and lost when the system is rebooted.

The host 20 is a network device and may comprise a computing device capable of storing and executing instructions for blockchain enhanced layered and integrated cyber security method and system. The host 20 is electrically connected to the blockchain network 30 and the information system 10. The host may further comprise a HELICS agent 21, a smart contract module 22 which may be connected, wired or wirelessly, to a messaging tool 50 configured to send the notification to an administrator.

The HELICS agent 21 resides on a host 20 and is continuously monitor for changes and automate near real-time response actions when unauthorized system configuration changes are identified. The agent 21 may generate a unique fingerprint associated with the system's current baseline configuration, comprising a plurality of security checks. This unique fingerprint may be a baseline master hash that is generated as the result of a security analysis on the information system 10. The agent then communicates with the Hyperledger and writes the current state of the system onto the ledger. The unique fingerprint is created by hashing each individual result produced from the security tool which scans the system.

For recording security states of the information system 10, The HELICS agent 21 may implement the Hyperledger Fabric blockchain. The Hyperledger Fabric blockchain network 30 (hereinafter Hyperledger 30) is an immutable ledger that may record the past, current and future states of an information system 10. In some embodiments, other blockchains could be used instead of Hyperledger Fabric. Preferably, the other blockchains would have advantages similar to those that the Hyperledger Fabric offers advantages by being open-sourced and backed by reputable organizations (IBM, Intel, and the Linux Foundation).

Furthermore, the HELICS agent 21 may be customized to use supplement or be used in combinations with other cyber security tool. The HELICS agent 21 provides a flexible method to provide cybersecurity on any computer architecture with minimal technical requirements. For example, the HELICS agent 21 may be written in Go, which executes quickly and has garbage collection to prevent memory leaks.

The smart contract 22 is supported on the Hyperledger Fabric to deploy self-executing contracts with the terms of the agreement written directly into lines of code. On other frameworks, smart contracts are also called "chaincode" and may be used as appropriate with other blockchain frameworks. Chaincode is written in programming languages such as Go, Java, or Python, and it allows developers to define the rules and logic for a particular use case. The benefits of smart contracts include automation of various processes, providing a transparent and tamper-proof record of transactions or agreements, and can censure that transactions are secure and that the rules of the agreements are enforced.

Here, a smart contract 22 may be triggered by changes made to the information system. Changes are identified from a security analysis performed by the host 20 or a security agent. The security analyses performs a plurality of security checks and determines if the information state has been altered, access, or otherwise infiltrated. If the security analysis yields any result indicating change or access to the information system 10, a smart contract 22 may be triggered to notify an administrator. An automatic, immediate notification to an administrator assures that unauthorized access is known as soon as it occurs. Any damage can then be immediately assessed and mitigated. The smart contract 22 may be created and deployed on the blockchain network into the Hyperledger framework and operate in tandem with the blockchain.

The blockchain triggers the smart contract 22 through a process called "event-driven execution". The following is an illustrative example of event-driven execution. A user sends a transaction to the contract address, which includes the triggering event (e.g., a function call or a specific condition). The transaction is received by a node on the blockchain network, which verifies the transaction and checks the contract's rules and conditions. If the transaction is valid, the node executes the smart contract, running the contract code and applying the rules and logic defined in the contract. The result of the contract execution is verified by other nodes on the network, ensuring that the contract's state is consistent across the network. Once consensus is achieved, the result of the contract execution is recorded on the blockchain, updating the state of the contract and the blockchain itself. Accordingly, the smart contract 22 provides a fast, secure, and immutable mechanism to ensure administrators are notified of an access or changes to an information system 10.

The smart contract 22 may be electrically connected (e.g. wired, wireless protocol, and cloud messaging . . . ) to a messaging tool 50 configured send a notification to an administrator. A variety of types of messaging tools exist including cloud communications tools, which provide many mediums and routes to send a message. Wired transmissions involve the use of physical cables, such as fiber optic cables, coaxial cables, or twisted pair cables, to transmit data between devices. Examples of wired transmissions include Ethernet connections, phone lines, and cable television. On the other hand, wireless transmissions use electromagnetic waves, such as radio waves, microwaves, or infrared waves, to transmit data through the air. Wireless transmissions can be further divided into several sub-types, including radio frequency (RF) transmissions, such as Wi-Fi and Bluetooth, and cellular network transmissions, such as 4G and 5G. Additionally, other types of wireless transmissions include satellite transmissions, which use satellites in orbit to transmit data over long distances, and infrared transmissions, which use light to transmit data between devices. Cloud communications tools include: Unified Communications as a Service (UCaaS), integrating voice, video, and messaging; VOIP, enabling voice calls over the internet; Video Conferencing Tools, such as Zoom and Google Meet; Messaging Apps, like Slack and Microsoft Teams; Collaboration Platforms, combining multiple tools into one workspace; Cloud PBX, replacing traditional phone systems; and API-based Communication Platforms, allowing custom application development. Additionally, there are Contact Center as a Service (CCaaS) for customer support, Omnichannel Communication Platforms for engaging with customers across multiple channels, and WebRTC Tools for real-time communication within web browsers. These message tools 50 enhance communication, collaboration, and customer engagement, and can be tailored to meet specific needs.

The blockchain network 30 is a distributed ledger technology and may be connected with a plurality of nodes 41-43 that may likewise contribute to the blockchain network 30. The plurality of nodes 41-43 shown in FIG. 1 are merely illustrative of many additional nodes that make up a blockchain network. For example, the Bitcoin and Ethereum networks consist of over 10,000 individual nodes. Each node may comprise computer or device that participates in a blockchain network by storing, verifying, and relaying blocks of transaction data, ensuring the integrity and consensus of the distributed ledger. Each node maintains a copy of the blockchain, which is updated as new blocks are added, and communicates with other nodes to validate and agree on the state of the blockchain through a consensus algorithm, such as proof-of-work or proof-of-stake. Nodes can be categorized into different types, including full nodes, which store the entire blockchain and verify all transactions, light nodes, which store only a subset of the blockchain and rely on full nodes for verification, and mining nodes, which compete to solve complex mathematical problems to validate new blocks and add them to the blockchain. By working together, blockchain nodes form a decentralized network that enables secure, transparent, and tamper-proof data storage and transfer, without the need for a central authority or intermediary.

Among blockchain networks, there exists two main types of access and control structures. Permissionless blockchain networks are open, public, and decentralized networks that allow anyone to join and participate without the need for permission or approval from a central authority. Permissioned blockchain networks, also known as private or consortium blockchains, are closed, private, and centralized networks that require permission or approval from a central authority to join and participate.

Hyperledger is a permissioned blockchain platform that enables secure, scalable, and transparent data sharing and transactions across a network of trusted participants. Unlike public blockchains, which are open to anyone, Hyperledger is a private blockchain that requires users to be authenticated and authorized to join the network, ensuring that only trusted entities can access and contribute to the blockchain. Hyperledger utilizes a modular architecture, allowing users to customize their blockchain implementation to meet specific use case requirements, and supports a range of consensus algorithms, including PBFT, SBFT, and Raft. The platform also provides a robust set of tools and features, such as smart contract support, identity management, and data privacy, making it an attractive solution for enterprises and organizations seeking to leverage blockchain technology for supply chain management, financial transactions, and other applications that require high levels of security, transparency, and accountability. By providing a permissioned and modular blockchain platform, Hyperledger enables organizations to create customized, secure, and scalable blockchain networks that meet their specific business needs.

In one embodiment, the method of cybersecurity monitoring 200 and the non-transitory computer-readable storage medium with computer executable instructions stored thereon executed by a process to perform the method of cybersecurity monitoring 300 utilize the Hyperledger network for the aforementioned benefits. Any other blockchain network with similar functionality may also be used.

Figure 2:
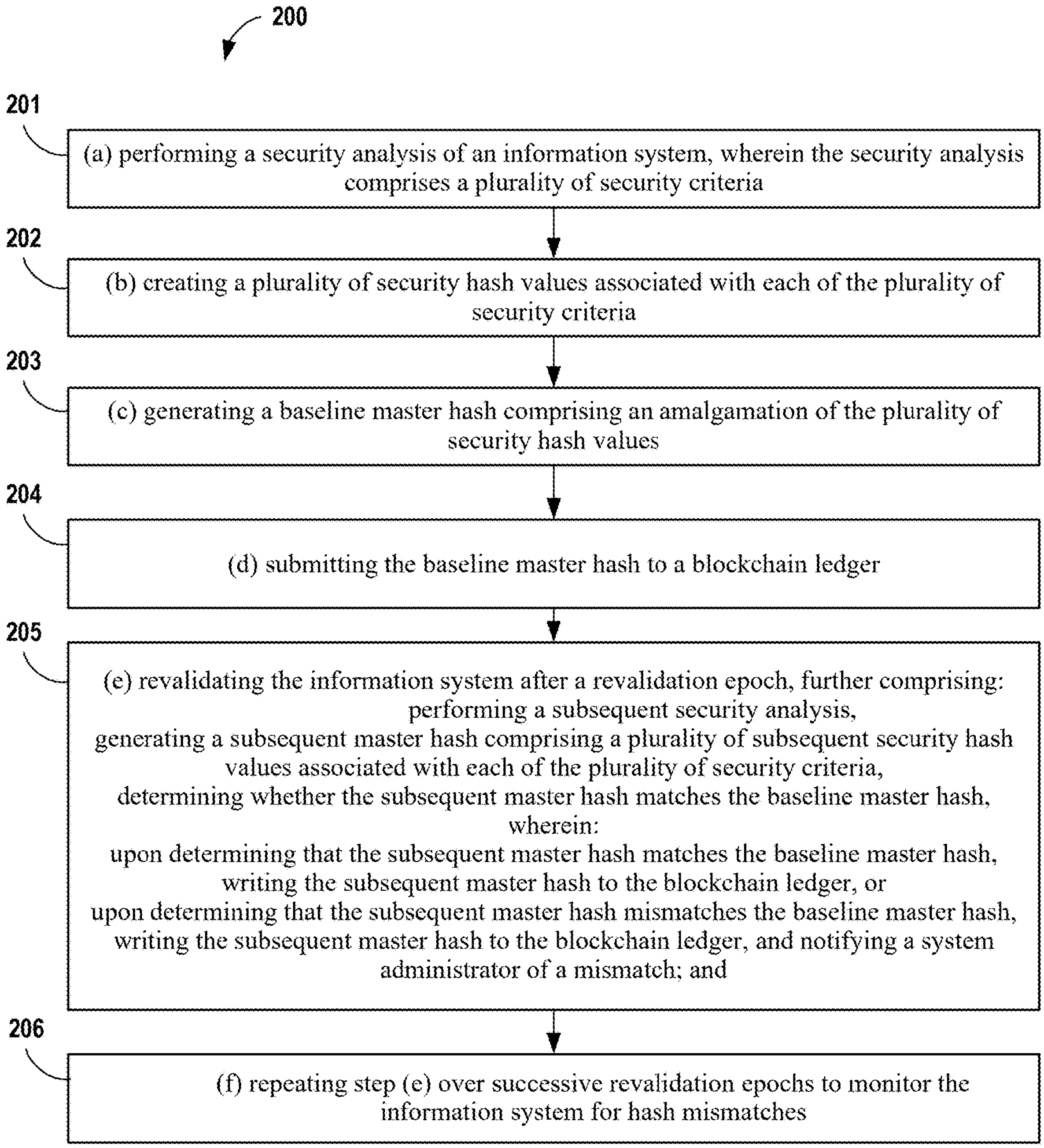
FIG. 2 shows a block-diagram illustration of a method of cybersecurity monitoring system.

FIG. 2 shows a block-diagram illustration of a method of cybersecurity monitoring system, the steps comprising (a) performing a security analysis of an information system, wherein the security analysis comprises a plurality of security criteria 201; (b) creating a plurality of security hash values associated with each of the plurality of security criteria 202; (c) generating a baseline master hash comprising an amalgamation of the plurality of security hash values 203; (d) submitting the baseline master hash to a blockchain ledger 204; (e) revalidating the information system after a revalidation epoch, further comprising: performing a subsequent security analysis, generating a subsequent master hash comprising a plurality of subsequent security hash values associated with each of the plurality of security criteria, determining whether the subsequent master hash matches the baseline master hash, wherein: upon determining that the subsequent master hash matches the baseline master hash, writing the subsequent master hash to the blockchain ledger, or upon determining that the subsequent master hash mismatches the baseline master hash, writing the subsequent master hash to the blockchain ledger, and notifying a system administrator of a mismatch 205; and (f) repeating step (e) over successive revalidation epochs to monitor the information system for hash mismatches 206.

In some embodiments, the for blockchain enhanced layered and integrated cyber security method and system may utilize Hyperledger Fabric, wherein the system and method may be referred to as a Hyperledger enhanced layered and integrated cyber security method and system (hereinafter "HELICS"). HELICS leverages a HELICS agent 21, the Hyperledger Fabric blockchain, and cyber security tools to create a unique fingerprint of an information system 10 to continuously monitor for changes and automate near real-time response actions when unauthorized system configuration changes are identified. The Hyperledger Fabric blockchain network 30 (hereinafter Hyperledger 30) is an immutable ledger which records the past, current and future states of an information system 10.

The step of (a) performing a security analysis of an information system, wherein the security analysis comprises a plurality of security criteria 201 comprises a security assessment according to a variety of security checks. A security analysis may be a technical evaluation of the information system 10 that yields a wide-variety of security related data including, but not limited to, system configurations, access controls, vulnerability assessments, network configurations, and compliance statuses. Security criteria are a set of checklist items or benchmarks that may be assessed by the security analysis. A security analysis may be implemented to assess for a set of security criteria. As some examples, the security analysis may be performed using CyberKnight, Security Content Automation Protocol (SCAP) Compliance Checker, or evaluate criteria corresponding to the Defense Information Systems Agency (DISA) Security Technical Implementation Guides (STIG).

In some embodiments, the method of cybersecurity monitoring may further comprise the step of determining the plurality of security criteria 201. The plurality of security criteria 201 may be determined from a set of criteria in a database. These criteria may be a checklist set standard-setting organizations including, but not limited to the Defense Information Systems Agency, Center for Internet Security, National Institute of Standards and Technology, Application Security Verification Standard, Payment Card Industry Data Security Standard, and Google's webmaster guidelines. For example, the Defense Information Systems Agency sets forth criteria in the Security Technical Implementation Guide. Alternatively, the plurality of security criteria may be determined by assessing the information program 10 for benchmarks that are associated with the operating system, applications, websites, networks, and/or devices having corresponding security criteria 201. This security criteria may be sourced directly from the operating system, applications, websites, networks, and/or devices, or retrieved from a security criteria database correlated with security criteria from each of the operating system, applications, websites, networks, and/or devices.

Checklist criteria, such as Security Technical Implementation Guides, may provide a configuration standard consisting of cyber security requirements. Examples of STIG/security criteria may include password requirements, network configurations, operating system configuration, application configuration, audit and logging, access control, data protection, vulnerability management, incident response, and compliance and governance. Each of the evaluation assessments can be captured with a hash function associated with each criteria. Then, a single hash value is created from the entire group of hashed results. This "master" hash represents the current state of the information system.

The step of (b) creating a plurality of security hash values associated with each of the plurality of security criteria 201 may comprise using a one-way hashing algorithm to hash the contents of each security criteria. The security criteria 201 comprise status information and finding details for each of the plurality of criteria. The status information may be an indication of compliance or non-compliance. The finding details comprise an explanation pertaining to the security analysis of a security criteria 201. In one illustrative embodiment, one security criteria may asses the length of a password where secure length is over sixteen characters. The status information may state "compliant" or "noncompliant" and the finding details may comprise an explanation of a password length (i.e. 8 characters or 20 characters). The status information and finding details of security criteria 201 may be determined by the security analysis. Accordingly, the hash 203 comprises a status (e.g. STIG's Vulnerability ID's (V-IDs)) and Finding Details data fields, resulting in something similar to (for example):

v-111111<hash of finding details>
V-111112<hash of finding details>
v-111113<hash of finding details>

This step may further include processing all V-IDs excluding automated checks which affect the state of the systems hard drive (as these are dynamic and subject to change at intervals which cannot be adequately tracked).

In exemplary embodiments, the system generates a hash of status information and finding details from the plurality of security criteria 201, whereby critical security information regarding information system 10 is immutably recorded in the blockchain ledger. This immutable record serves as a cryptographically secure timestamp of the system's security posture, ensuring that security audit data cannot be tampered with or altered retrospectively. The distributed nature of blockchain technology provides an additional layer of integrity verification, as each node maintains a copy of these security attestations.

In operation, any modification to previously assessed security criteria becomes immediately detectable through comparison with the blockchain ledger. For example, when a password policy compliance state changes from a previously recorded compliant state (e.g., 20-character length) to a non-compliant state (e.g., 8-character length), the system automatically identifies this deviation through ledger comparison and flags the security mismatch. This innovative approach provides a robust and reliable mechanism for real-time detection of security breaches and unauthorized modifications to information system 10, thereby enabling proactive security monitoring and rapid incident response.

The step of (c) generating a baseline master hash comprising an amalgamation of the plurality of security hash values 203 is the aggregation of the security criteria hash in the systems initial state or at the first instance of evaluation. Using a one-way hashing algorithm, hash all the resulting V-ID's and Finding Details hashes into a single "baseline master" hash, which reflects the sum total of the systems secure baseline.

The step of (d) submitting the baseline master hash to a blockchain ledger 204 comprises writing the baseline master hash to the blockchain ledger. In some embodiments, the blockchain ledger is a Hyperledger. The baseline master hash may be a benchmark of comprise for future hashes written to the blockchain ledger. If a subsequent hash differs from the baseline hash, it may trigger an event.

The step of (e) revalidating the information system after a revalidation epoch, further comprising: performing a subsequent security analysis, generating a subsequent master hash comprising a plurality of subsequent security hash values associated with each of the plurality of security criteria, determining whether the subsequent master hash matches the baseline hash, wherein: upon determining that the subsequent master hash matches the baseline hash, writing the subsequent master hash to the blockchain ledger, or upon determining that the subsequent master hash mismatches the baseline hash, writing the subsequent master hash to the blockchain ledger, and notifying a system administrator of a mismatch 205 comprises repeating the security analysis, creation of a hash, and writing the new hash to the blockchain. This step periodically performs a security analysis to detect any change to the information system. A change can be identified by comparing the subsequent master hash with the baseline master hash. Any changes to the system will generate a new, unique master hash by nature of one-way hash functions.

In either case of changes detected or not detected, the new hash may be written to the blockchain. If no change is detected, a system administrator does not need to be notified of a mismatch and that step is not required. However, if a change is detected, the system administrator may be notified. The notification may proceed automatically through the smart contract 22.

The revalidation epoch is a time period that the admin sets to revalidate the system. The epoch may be any value suitable for a security analysis. For an example, the revalidation epoch may be from one minute to twenty-four hours. In other embodiments, the time frame may be from one second to a month. However, the revalidation epoch is not limited to the aforementioned time frame and may be related to other factors, such as manually, by an administrator, or automatically when connected to a network or otherwise requested.

The step of (f) repeating step (e) over successive revalidation epochs to monitor the information system for hash mismatches 206 comprising rescanning the information system 10 based on the administrative preferred revalidation epoch (i.e. every 10, 15, 30 minutes). A new master hash will be generated with any changes made since the last system scan. Each subsequent master hash gets recorded on the Hyperledger. In some embodiments, an automated response may be initiated via smart contracts. Currently, HELICS will automatically send a text message to an administrator if a change is detected. Smart contracts, or Chaincode, is code that resides on the blockchain and self-executes when the proper conditions are met. In this case, the smart contracts self-execute whenever the master hash value changes.

Furthermore, the cybersecurity monitoring method 200 may comprise a plurality of HELICS agents 21 setup to each run on one of a plurality of information systems. A plurality of information systems 10 may be, for example, a set of devices within an organization. Each device may perform the cybersecurity monitoring method 200 that reports changes in the security analysis for any of the devices to an administrator. These notifications may comprise identifying information for the device (information system 10) for which a mismatch is detected. Accordingly, the security status of a plurality of device may be tracked.

Figure 3:
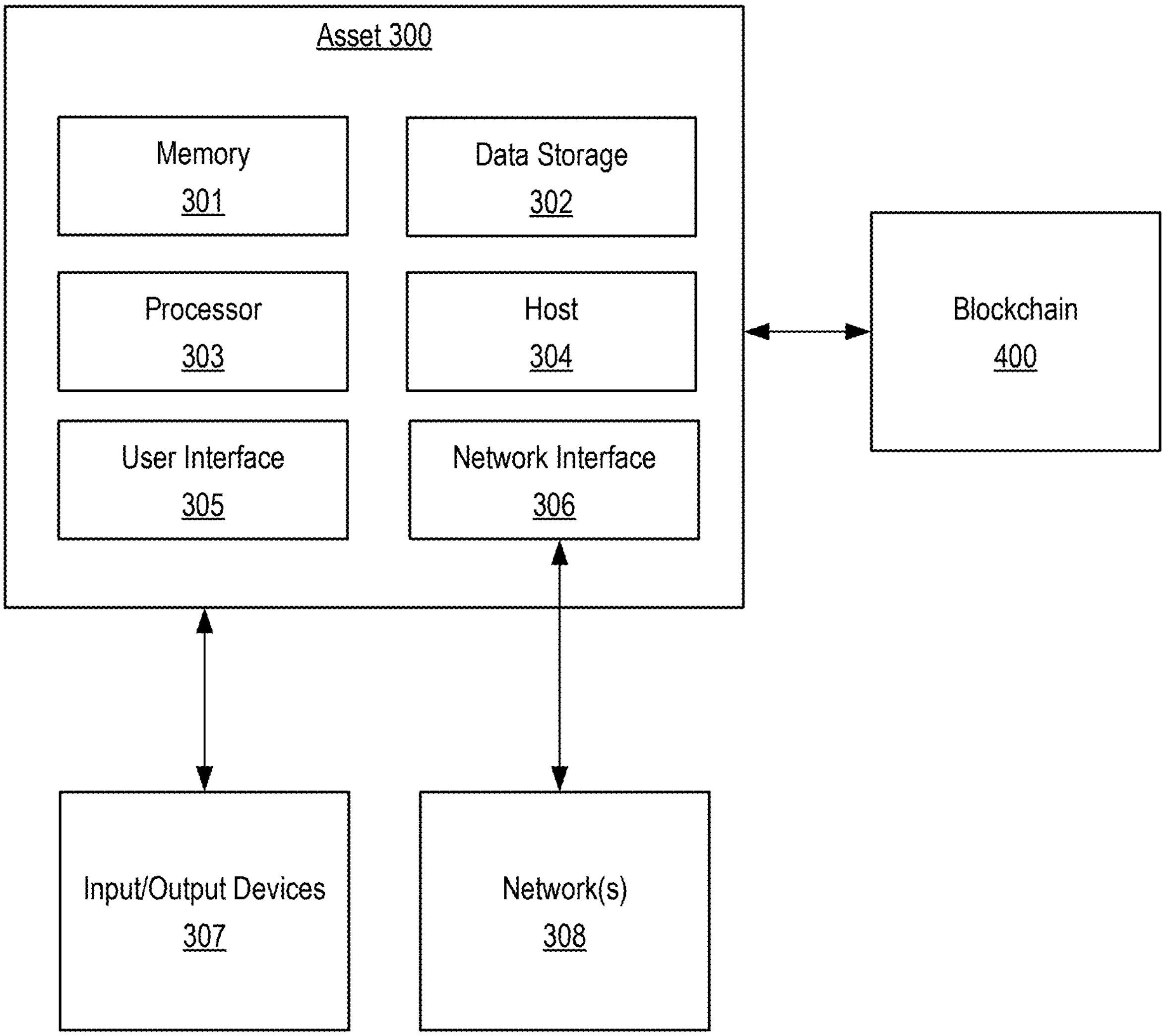
FIG. 3 shows a block-diagram illustration of an asset or a computing device comprising memory, data storage, processor, host, user interface, network interface, input/output devices, network(s), wherein the asset is connected to a blockchain.

FIG. 3 shows a block-diagram illustration of an asset 300 or a computing device comprising memory 301, data storage 302, processor 303, host 304, user interface 305, network interface 306, input/output devices 307, network(s) 308, wherein the asset 300 is connected to a Blockchain 400. The asset 300 may be non-transitory computer-readable storage medium with computer executable instructions stored thereon. The asset 300 or computing device typically includes a variety of non-transitory computer readable media. By way of example, and not limitation, computer readable media may comprise Random Access Memory (RAM); Read Only Memory (ROM); Electronically Erasable Programmable Read Only Memory (EEPROM); flash memory or other memory 301 technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device. Computer storage media does not, however, include propagated signals. Rather, computer storage media excludes propagated signals. Any such computer storage media may be part of computing device.

Memory 301 includes computer storage media in the form of volatile and/or nonvolatile memory. The memory may be removable, non-removable, or a combination thereof. Examples of hardware devices include solid-state memory, hard drives, optical-disc drives, etc. Processors 303 read data from various entities such as memory 301 or I/O components 307. Memory 301 stores, among other data, one or more applications. The applications, when executed by the one or more processors, operate to perform functionality on the computing device. The applications may communicate with counterpart applications or services such as web services accessible via a network (not shown). For example, the applications may represent downloaded client-side applications that correspond to server-side services executing in a cloud. In some examples, aspects of the disclosure may distribute an application across a computing system, with server-side services executing in a cloud based on input and/or interaction received at client-side instances of the application. In other examples, application instances may be configured to communicate with data sources and other computing resources in a cloud during runtime, such as communicating with a cluster manager or health manager during a monitored upgrade or may share and/or aggregate data between client-side services and cloud services.

Preferred embodiments comprises a computer device that meets or exceeds minimum system requirements to run modern programs and applications. For example, a computing device comprising four gigabytes of ram, fifty gigabytes of memory, and a two-core central processing unit would sufficiently run the HELICS agent 21 and perform the cybersecurity monitoring method 10.

Figure 4:
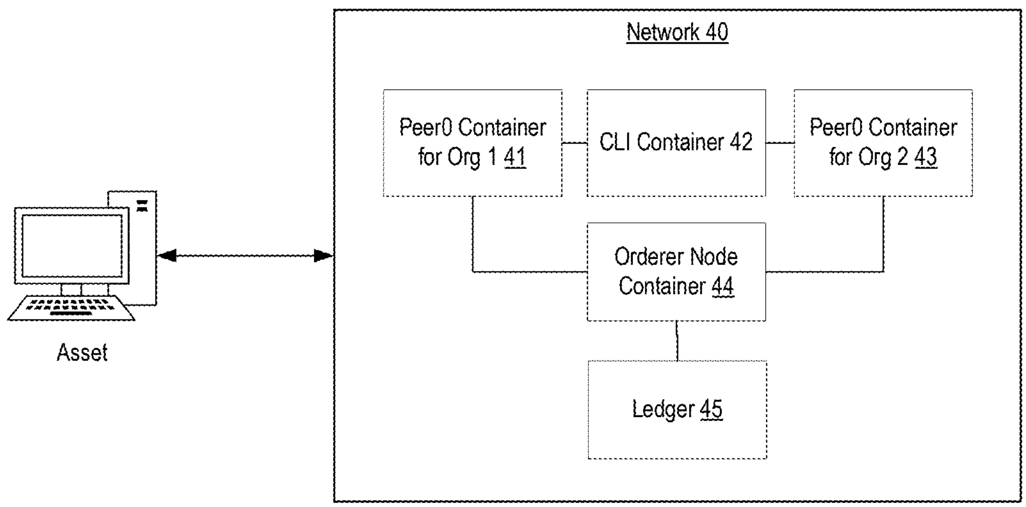
FIG. 4 shows a block-diagram illustration of a Hyperledger Fabric Test Network Configuration set up by using a default test network.

FIG. 4 shows a block-diagram illustration of a Hyperledger Fabric Test Network Configuration set up by using a default test network. This test network configuration, shown in FIG. 3, is only one embodiment of the disclosed subject matter herein. The default test network 40 consists of four Docker containers: two peered containers hosting test peers (named "Org1 peer0" 41 and "Org2 peer0" 43 to represent two unique organizations), a third "Orderer Node" 44 container which is responsible for maintaining the order of the ledger's transactions, and a final container which is responsible for handling a set of pre-configured tools and CLI commands 42 (only accessible to privileged users). These components combine to form a channel configuration (CC). The channel configuration block contains a list of all organizations which are able to join and make transactions on the channel.

With a Blockchain Enhanced Layered and Integrated Cyber Security Method and System, multiple information systems 10 may be continuously monitored. Each information system 10 may be associated with a unique or the same organization, and each able to have its own administrator as well as its own Certificate Authority. For smart contract, the Hyperledger Fabric allows different endorsement policies and transactional approvals which can be configured for different organizations. Each peer node in an organization is responsible for its own submissions and read/write access to the Hyperledger. When a node receives a transaction from an asset, the node validates the transaction with each of its peers on the blockchain. Before the transaction is committed it to the ledger, an orderer node properly and efficiently orders the transaction submitted by peers in each organization so the ledger can maintain a proper record of all transactions.

Furthermore, the Hyperledger fabric further comprises a private channel feature that enables privileged access for some user, providing added security. This feature is not unique to Hyperledger, and may be used accordingly on similar blockchains. For illustrative purposes, a private channel on a Hyperledger may be designed for a particularly sensitive information system, so that an administrator(s) are the only ones to receive/view results of the HELICS agent 21. In sum, the private channel abilities of some blockchains enable a functionality of having private channels for at least one information system 10.

FIG. 4 shows a study network configuration using peer0 on organization 1 to submit blocks to the Hyperledger. The target asset which was monitored by STIG analysis was the host system of the docker containers running the Fabric test-network. The following is a study designed to testing the functionality and efficacy of the disclosed subject matter. This study is illustrative of the subject matter's functionality and viability, but is in no way limiting on the scope.

Figure 5A:
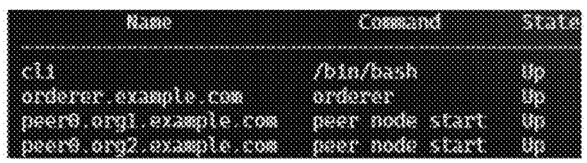
FIG. 5A shows an exemplary screen shot of a Hyperledger docker based reference test-network.

The target asset was analyzed using the Ubuntu 20.04 Operating System DISA STIG and two STIG analysis tools were used-CyberKnight and the SCAP Compliance Checker. The periodicity of the STIG analysis was set to every five minutes. The HELICS agent was written using the programming language Go which performs the STIG analysis on the target asset every five minutes, generates the hashes, and submits each hash to the Hyperledger using peer0.org1.example.com, as seen in FIG. 5A as a screenshot (Hyperledger docker based reference test-network).

Configuring Hyperledger and issuing commands is traditionally done via command line interface. However, this use case utilized custom bash scripts to interact with the Hyperledger. Scripts were created which can initiate the Hyperledger, edit the Hyperledger and read from the Hyperledger. The scripts allow for automation and repeatability.

List of scripts used for Hyperledger interactions:

Asset-exists.sh
: To check if an existing asset exists on the Hyperledger. Returns true or false based on the query. Ensures queries are functional.

Compare-hash.sh
: To compare a test hash against the currently installed hash on the Hyperledger. Returns true or false based on the comparison. Allows for testing validation logic.

Create-asset.sh
: Manually creates a new asset to continuously monitor via the Hyperledger.

Delete-asset.sh
: Manually deletes an asset on the Hyperledger.

Get-all-assets.sh
: Returns all assets currently on the Hyperledger.

Get-history.sh
: Returns all history of an asset on the Hyperledger (with timestamps). Useful for tracing down how & when different hashes were submitted to the Hyperledger.

Read-asset.sh
: Returns query data for one asset currently on the Hyperledger.

InstallCC.sh
: Automatic script to install the "chain-code" or smart contract capability on the Hyperledger.

SetOrgEnv.sh
: Sets environment variables for easier transaction and querying of the data on the Hyperledger.

Update-asset.sh
: Manually updates an asset on the Hyperledger.

Update-hash.sh
: Manually updates only the hash value of an asset on the Hyperledger.

Figure 5B:
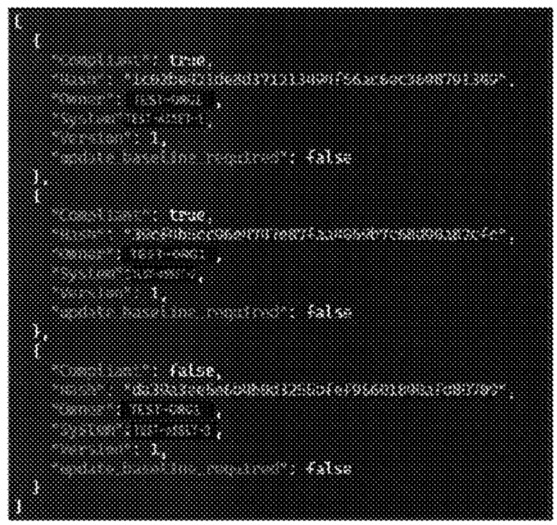
FIG. 5B shows an exemplary screenshot of study comprising an initial Hyperledger test assets.

Custom "chaincode" or "smart contracts" were written into the Hyperledger in order to test for vulnerability management automation. The chaincode would validate every hash submission and check it against the previous submission. If a "hash mismatch" occurred, Hyperledger would issue an "event" that the target agent would detect, and the agent would notify a team member by Short Messaging Service (SMS). An example of the initial Hyperledger test assets is illustrated below in FIG. 5B, which is a screen capture of the Hyperledger assets. Note -original asset names as well as organizations have been redacted and replaced with generic names of "TEST-ORG #" and "TEST-ASSET" or "ASSET-#" in further screen captures. For this use case, the Hyperledger was populated with three test assets with inaccurate "hash" values: "TEST-ASSET1," "TEST-ASSET-2," and "TEST-ASSET-3".

Figure 5C:
FIG. 5C shows an exemplary screenshot of a HELICS agent starting, completing STIG checks, and determining a baseline master hash.
Figure 5D:
FIG. 5D shows an exemplary screenshot of a HELICS agent completing a steady state of STIG checks.

The exemplary study consisted of executing the HELICS agent 21, which would run an appropriate STIG Analysis tool based on the host's operating system (CyberKnight, or SCC). An example HELICS agent starting is shown in FIG. 5C. FIG. 5D shows the HELICS agent producing steady-state hashes.

FIG. 5C shows an exemplary screenshot of a HELICS agent starting, completing STIG checks, and determining a baseline master hash. As seen in FIG. 5C, the chaincode event is listening, the STIG checks are completing, and a master hash is created. FIG. 5D shows an exemplary screenshot of a HELICS agent completing a steady state of STIG checks. This is shown by the successive STIG checks with the subsequent master hashes. Each of the subsequent master hashes are generated after a revalidation epoch.

Figure 6A:
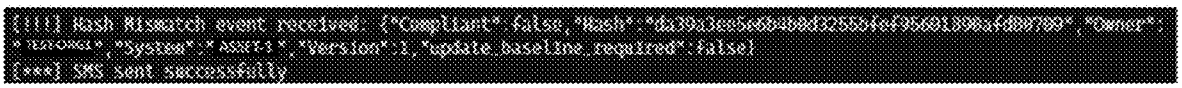
FIG. 6A shows an exemplary screenshot of HELICS agent determining a hash-mismatch and triggering an SMS alert.
Figure 6B:
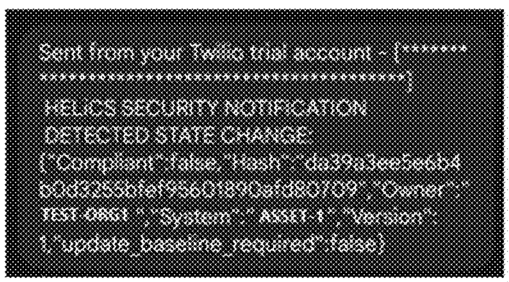
FIG. 6B shows an exemplary screenshot of SMS message sent by the HELICS agent.

When a "hash-mismatch" event did occur, the HELICS agent successfully took immediate, programmable action. FIG. 6A shows an example hash-mismatch, triggering an SMS alert. An exemplary administrator notification, in this case an SMS message, is shown in FIG. 6B. A SMS screenshot of HELICS notification is shown in FIG. 6B.

FIG. 6A shows an exemplary screenshot of HELICS agent determine a hash-mismatch and triggering an SMS alert. As described previously, an SMS text alert is one of many possible modalities of an administrator notification. FIG. 6B shows an exemplary screenshot of SMS message sent by the HELICS agent.

Historical results were available which provide traceability and a complete record of secure configuration compliance when utilized. FIG. 7 shows an exemplary screenshot of a Historical record of asset on Hyperledger. Seen as an example in FIG. 7, the example "TEST-HASHINVALID" was manually invoked onto the Hyperledger. Five minutes later, the agent rescanned the asset and wrote the correct hash to the Hyperledger.

From the above description of Blockchain Enhanced Layered and Integrated Cyber Security Method and System, it is manifest that various techniques may be used for implementing the concepts of a method of cybersecurity monitoring and a non-transitory computer-readable storage medium with computer executable instructions stored thereon executable by a process to perform the method of cybersecurity monitoring without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that a method of cybersecurity monitoring and a non-transitory computer-readable storage medium with computer executable instructions stored thereon executable by a process to perform the method of cybersecurity monitoring are not limited to the particular embodiments described herein, but is capable of many embodiments without departing from the scope of the claims.

What is claimed:

1. A method of cybersecurity monitoring, the method comprising:

performing a security analysis of an information system, wherein the security analysis comprises a plurality of security criteria;

(b) creating a plurality of security hash values associated with each of the plurality of security criteria;

(c) generating a baseline master hash comprising an amalgamation of the plurality of security hash values;

(d) submitting the baseline master hash to a blockchain ledger;

(e) revalidating the information system after a revalidation epoch, the revalidation of the information system further comprising:

performing a subsequent security analysis, generating a subsequent master hash comprising a plurality of subsequent security hash values associated with each of the plurality of security criteria, determining whether the subsequent master hash matches the baseline master hash, wherein:

upon determining that the subsequent master hash matches the baseline master hash, writing the subsequent master hash to the blockchain ledger, or upon determining that the subsequent master hash mismatches the baseline master hash, writing the subsequent master hash to the blockchain ledger, and notifying a system administrator of the mismatch; and (f) repeating step (e) over successive revalidation epochs to monitor the information system for hash mismatches.

2. The method of cybersecurity monitoring of claim 1, wherein the plurality of security criteria comprise status information and finding details, and wherein the status information and the finding details are determined by the security analysis.

3. The method of cybersecurity monitoring of claim 1, further comprising the step of:

determining the plurality of security criteria from by Security Technical Implementation Guide standards.

4. The method of cybersecurity monitoring of claim 1, further comprising the step of:

determining the plurality of security criteria by assessing the information system for criteria.

5. The method of cybersecurity monitoring of claim 1, wherein the security analysis is performed using CyberKnight or Security Content Automation Protocol (SCAP) Compliance Checker.

6. The method of cybersecurity monitoring of claim 1, wherein the revalidation epoch is from one minute to twenty-four hours.

7. The method of cybersecurity monitoring of claim 1, wherein upon determining that the subsequent master hash mismatches the baseline master hash the method further comprises self-activating a smart contract that triggers an administrator notification.

8. The method of cybersecurity monitoring of claim 7, wherein the administrator notification comprises a wirelessly transmitted message.

9. The method of cybersecurity monitoring of claim 1, wherein the blockchain ledger is Hyperledger Fabric.

10. The method of cybersecurity monitoring of claim 1, wherein the information system comprises data selected from the group consisting of personally identifiable information (PII), health records, trade secrets, and classified information.

11. A non-transitory computer-readable storage medium with computer executable instructions stored thereon executable by a processor to perform a method of cybersecurity monitoring, the method comprising:

(a) performing a security analysis of an information system, wherein the security analysis comprises a plurality of security criteria;

(b) creating a plurality of security hash values associated with each of the plurality of security criteria;

(c) generating a baseline master hash comprising an amalgamation of the plurality of security hash values;

(d) submitting the baseline master hash to a blockchain ledger;

(e) revalidating the information system after a revalidation epoch, the revalidation of the information system further comprising:

performing a subsequent security analysis, generating a subsequent master hash comprising a plurality of subsequent security hash values associated with each of the plurality of security criteria, determining whether the subsequent master hash matches the baseline master hash, wherein:

upon determining that the subsequent master hash matches the baseline master hash, writing the subsequent master hash to the blockchain ledger, or upon determining that the subsequent master hash mismatches the baseline master hash, writing the subsequent master hash to the blockchain ledger, and notifying a system administrator of the mismatch; and (f) repeating step (e) over successive revalidation epochs to monitor the information system for hash mismatches.

12. The non-transitory computer-readable storage medium of claim 11, wherein the plurality of security criteria comprise status information and finding details, and wherein the status information and the finding details are determined by the security analysis.

13. The non-transitory computer-readable storage medium of claim 11, the method further comprising the step of:

determining the plurality of security criteria from by Security Technical Implementation Guide standards.

14. The non-transitory computer-readable storage medium of claim 11, the method further comprising the step of:

determining the plurality of security criteria by assessing the information system for criteria.

15. The non-transitory computer-readable storage medium of claim 11, wherein upon determining that the subsequent master hash mismatches the baseline hash the method further comprises self-activating a smart contract that triggers an administrator notification.

16. The non-transitory computer-readable storage medium of claim 15, wherein the administrator notification comprises a wirelessly transmitted message.

17. The non-transitory computer-readable storage medium of claim 11, wherein the blockchain ledger is Hyperledger Fabric.

* * * * *